US011415592B2

(12) United States Patent
Eagleman

(10) Patent No.: US 11,415,592 B2
(45) Date of Patent: Aug. 16, 2022

(54) COMPUTING DEVICE AND RELATED METHODS FOR DETERMINING WIND SPEED VALUES FROM LOCAL ATMOSPHERIC EVENTS

(71) Applicant: James Eagleman, Eufaula, AL (US)

(72) Inventor: James Eagleman, Eufaula, AL (US)

( * ) Notice: Subject to any disclaimer, the term of this patent is extended or adjusted under 35 U.S.C. 154(b) by 0 days.

(21) Appl. No.: 16/907,495

(22) Filed: Jun. 22, 2020

(65) Prior Publication Data

US 2020/0400706 A1    Dec. 24, 2020

Related U.S. Application Data

(60) Provisional application No. 62/863,906, filed on Jun. 20, 2019.

(51) Int. Cl.
| | |
|---|---|
| *G01P 5/00* | (2006.01) |
| *G01W 1/10* | (2006.01) |
| *G01W 1/02* | (2006.01) |
| *G06F 3/0482* | (2013.01) |

(52) U.S. Cl.
CPC .............. *G01P 5/00* (2013.01); *G01W 1/02* (2013.01); *G01W 1/10* (2013.01); *G01W 2203/00* (2013.01); *G06F 3/0482* (2013.01)

(58) Field of Classification Search
CPC . G01P 5/00; G01W 1/02; G01W 1/10; G01W 2203/00; G06F 3/0482; G06F 3/04847; G06F 3/0304; G06F 1/1694; G06F 1/1686
See application file for complete search history.

(56) References Cited

U.S. PATENT DOCUMENTS

| | | | |
|---|---|---|---|
| 3,826,135 A * | 7/1974 | Hollmann | G01W 1/14 73/171 |
| 7,832,137 B2 | 11/2010 | Sammut et al. | |
| 8,991,702 B1 | 3/2015 | Sammut et al. | |
| 9,370,704 B2 | 6/2016 | Marty | |
| 9,459,077 B2 | 10/2016 | Sammut et al. | |
| 9,500,444 B2 | 11/2016 | Sammut et al. | |
| 2007/0112511 A1* | 5/2007 | Burfeind | 701/213 |
| 2009/0235570 A1* | 9/2009 | Sammut | 42/122 |

(Continued)

FOREIGN PATENT DOCUMENTS

WO    WO20191582222 A1 *    8/2019    ............... G01P 5/00

*Primary Examiner* — Tarun Sinha
*Assistant Examiner* — Lal C Mang
(74) *Attorney, Agent, or Firm* — Allen, Dyer, Doppelt + Gilchrist, PA

(57) ABSTRACT

A computing device comprising a portable housing having opposing top and bottom edges and opposing side edges, a memory carried by the portable housing, a display carried by the portable housing, a rotational motion sensor carried by the portable housing, and a processor carried by the portable housing and coupled to the memory, the display, and the rotational sensor. The processor may be configured to determine a rotational angle of the portable housing based upon the rotational motion sensor as the portable housing is rotated to a position where an orientation of at least one of the sides of the portable housing matches an orientation of a localized atmospheric event, calculate a localized wind speed value from the determined rotational angle, and output the calculated localized wind speed value on the display.

20 Claims, 6 Drawing Sheets

(56) References Cited

U.S. PATENT DOCUMENTS

| | | | |
|---|---|---|---|
| 2016/0084617 A1* | 3/2016 | Lyren | F41G 3/08 3/12 |
| 2019/0137993 A1* | 5/2019 | Bertrand | G05D 1/0016 |
| 2019/0154722 A1* | 5/2019 | Chien | G01P 5/14 5/14 |
| 2019/0226808 A1* | 7/2019 | Gallery | F41G 3/26 |
| 2020/0284819 A1* | 9/2020 | Dumont | |

* cited by examiner

COMPUTING DEVICE AND RELATED METHODS FOR DETERMINING WIND SPEED VALUES FROM LOCAL ATMOSPHERIC EVENTS

CROSS-REFERENCE TO RELATED APPLICATIONS

This application claims the benefit of U.S. provisional application No. 62/863,906 filed Jun. 20, 2019, which is hereby incorporated herein in its entirety by reference.

TECHNICAL FIELD

The present invention relates to the field of computing devices and, more particularly, computing devices for taking atmospheric measurements and related methods.

BACKGROUND

While access to weather data from sources such as Doppler radar, satellites, and surface weather stations continues to grow and provide more accurate atmospheric information, there remains numerous applications where estimation of localized atmospheric conditions that cannot be obtained from such sources is important. For example, in activities such as photography and hunting, range to an object is required for accurate shots. While accurate laser range finders are readily available for range estimation, certain atmospheric conditions can affect the accuracy of such measurements. For example, in high heat conditions, objects that are at farther distances can be lost in a mirage because the mirage bends the laser light such that it does not bounce back to the rangefinder. As such, the rangefinder is not able to estimate the distance to the target.

Wind is another atmospheric condition that can be important to estimate at the local level. For example, in sporting activities such as golf, a flag is placed on the green to provide a visual indication of the wind's direction and speed at the target, the effects of which are greater the farther the golfer is away from the target. The same is true in long range shooting or hunting scenarios, where the target may be over a thousand yards away. With such applications, the wind at the target location can be and often is significantly different than at the starting location.

Accordingly, accounting for localized atmospheric events may be important for providing ed accuracy in various applications.

SUMMARY

A computing device may include a portable housing having opposing top and bottom edges and opposing side edges, a memory carried by the portable housing, a display carried by the portable housing, a rotational motion sensor carried by the portable housing, and a processor carried by the portable housing and coupled to the memory, the display, and the rotational sensor. The processor may be configured to determine a rotational angle of the portable housing based upon the rotational motion sensor as the portable housing is rotated to a position where an orientation of at least one of the sides of the portable housing matches an orientation of a localized atmospheric event, calculate a localized wind speed value from the determined rotational angle, and output the calculated localized wind speed value on the display.

In an example embodiment, the processor may be further configured to display at least one rotational reference indicator on the display that is parallel to the at least one side of the portable housing. Furthermore, in one example implementation the localized atmospheric event may comprise a mirage, the processor may be further configured to display a plurality of different user selectable mirage patterns on the display, and the processor may calculate the localized wind speed value further based upon a selected mirage pattern. More particularly, the different user selectable mirage patterns may correspond to different wind directions. Additionally, the processor may be configured to calculate a cosine corrected wind speed value based upon the selected mirage pattern.

In accordance with another example implementation, the localized atmospheric event may comprise rain, the processor may be further configured to display a plurality of user selectable rain intensity indicators on the display corresponding to different respective rain intensities, and calculate the localized wind speed value further based upon a selected rain intensity indicator. By way of example, the rotational motion sensor may comprise at least one of an accelerometer, gyroscope, and a magnetic field sensor.

A related non-transitory computer-readable readable medium is also provided for a computing device, such as the one described briefly above. The non-transitory computer-readable medium may have computer-executable instructions for causing the processor to perform steps including determining a rotational angle of the portable housing based upon the rotational motion sensor as the portable housing is rotated to a position where an orientation of at least one of the sides of the portable housing matches an orientation of a localized atmospheric event, calculating a localized wind speed value from the determined rotational angle, and outputting the calculated localized wind speed value on the display.

DETAILED DESCRIPTION

The present disclosure is provided with reference to the accompanying drawings, in which various embodiments are shown. However, other embodiments in many different forms may be used, and the disclosure should not be construed as limited to the particular embodiments set forth herein. Rather, these embodiments are provided so that this disclosure will be thorough and complete, and will fully convey the claim scope to those skilled in the art.

Figure 1:
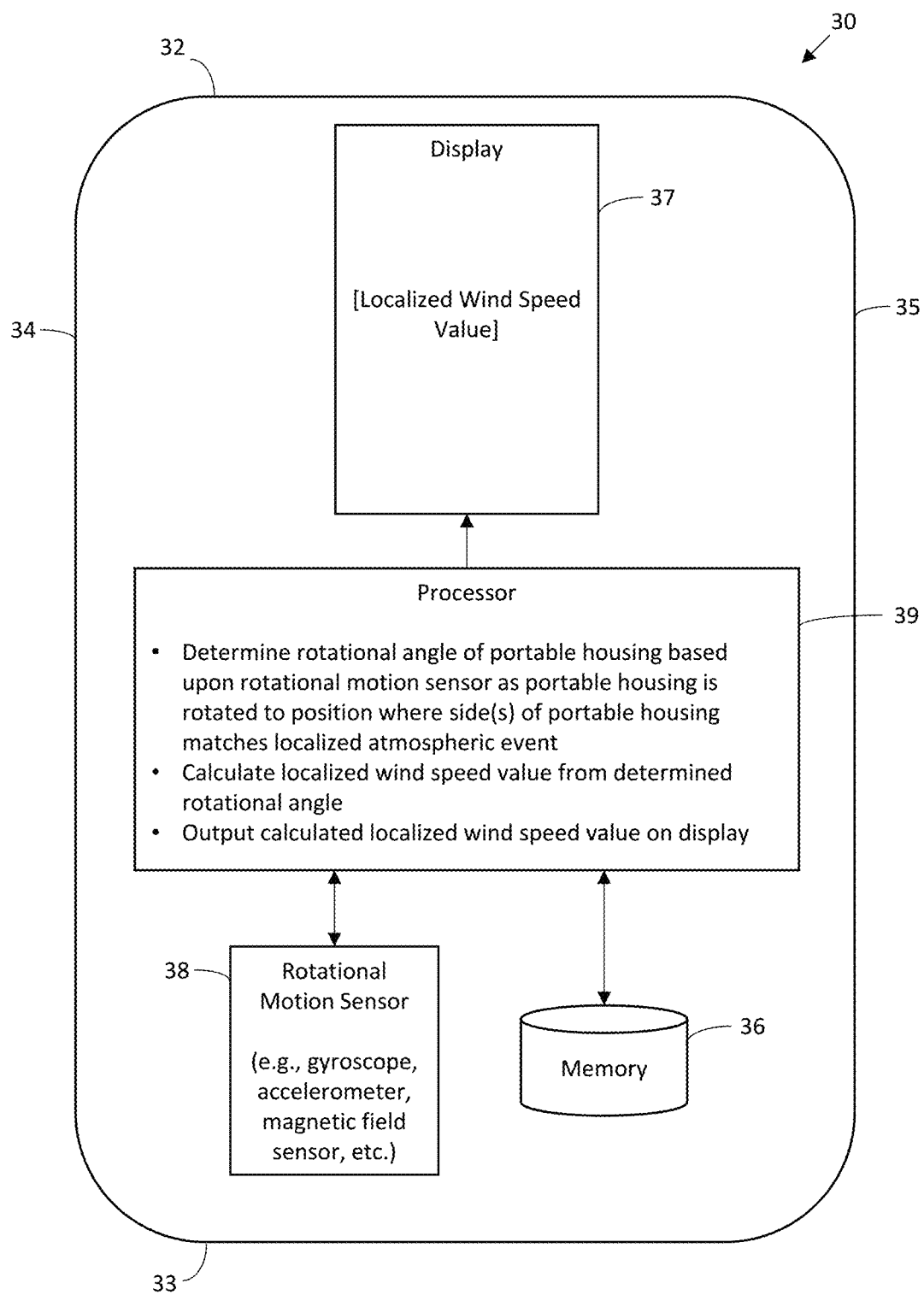
FIG. 1 is a schematic block diagram of a computing device in accordance with an example embodiment which may be used for determining wind speed values from local atmospheric events.

Referring initially to FIG. 1, a computing device 30 which may advantageously provide an estimation of wind speed based upon local atmospheric events is first described. The computing device 30 illustratively includes a portable housing 31 having opposing top and bottom edges 32, 33 and opposing side edges 34, 35. A memory 36, display 37, rotational motion sensor 38, and processor 39 are carried by the portable housing 31. The processor 38 is illustratively coupled or connected to the memory 36, the display 37, and the rotational motion sensor 38.

By way of example, the computing device 30 may be a mobile computing device such as a smartphone, tablet computer, laptop computer, or in some implementations it may be an application specific device for wind speed estimation. In the present example, the portable housing 31 has a generally rectangular form factor in which the top and bottom edges 32, 33 are parallel to one another, as are the side edges 34, 35. However, other form factors and shapes may be used in different embodiments. The display may take various forms, such as a liquid crystal display (LCD), light-emitting diode (LED), organic LED (OLED), small molecule OLED (SMOLED), thin film transistor (TFT), in-plane switching (IPS), etc. By way of example, the rotational motion sensor 38 may include one or more of a gyroscope, a magnetic (geomagnetic) field sensor, and an accelerometer. More particularly, gyroscopes and magnetic field sensors may be configured to provide rotational angles on their own, but in some instances measurements from an accelerometer may be used to help increase the accuracy of a gyroscope or magnetic field sensor, if desired. The processor 39 may be a microprocessor, application specific integrated circuit (ASIC), etc., for example.

The processor 39 is configured to determine a rotational angle of the portable housing 31 based upon the rotational motion sensor 38 as the portable housing is rotated to a position where an orientation of the portable housing, and more particularly the sides 34, 35 of the portable housing, matches an orientation of a localized atmospheric event. One example of a localized atmospheric event is rain. Wind has the effect of pushing rain over in the direction the wind is blowing, such that the rain appears to lean forward in that direction from the perspective of the observer. This is the angle of the rain, and referred to as the "rain angle" herein. If there is no wind, the rain will be vertically straight up and down relative to the ground, and therefore have a zero mirage angle.

Figure 2B:
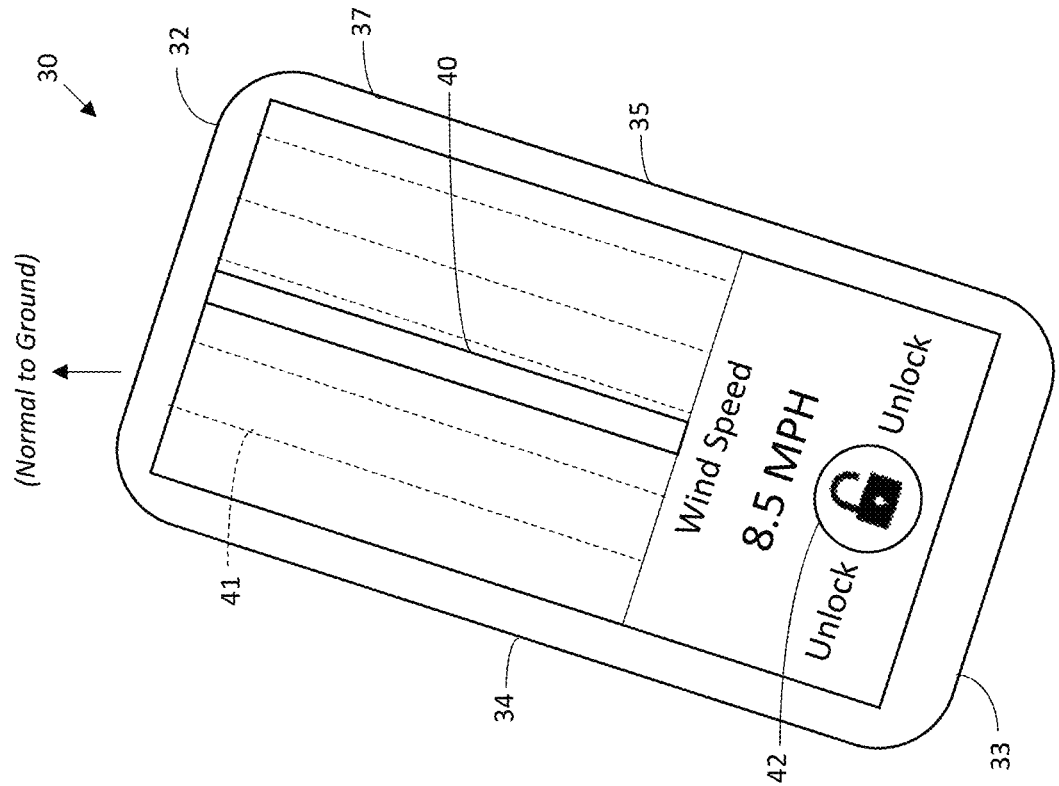
FIGS. 2A and 2B are front views of an example embodiment of the computing device of FIG. 1 showing how to align the computing device with an angle of falling rain to determine wind speed.
Figure 2A:
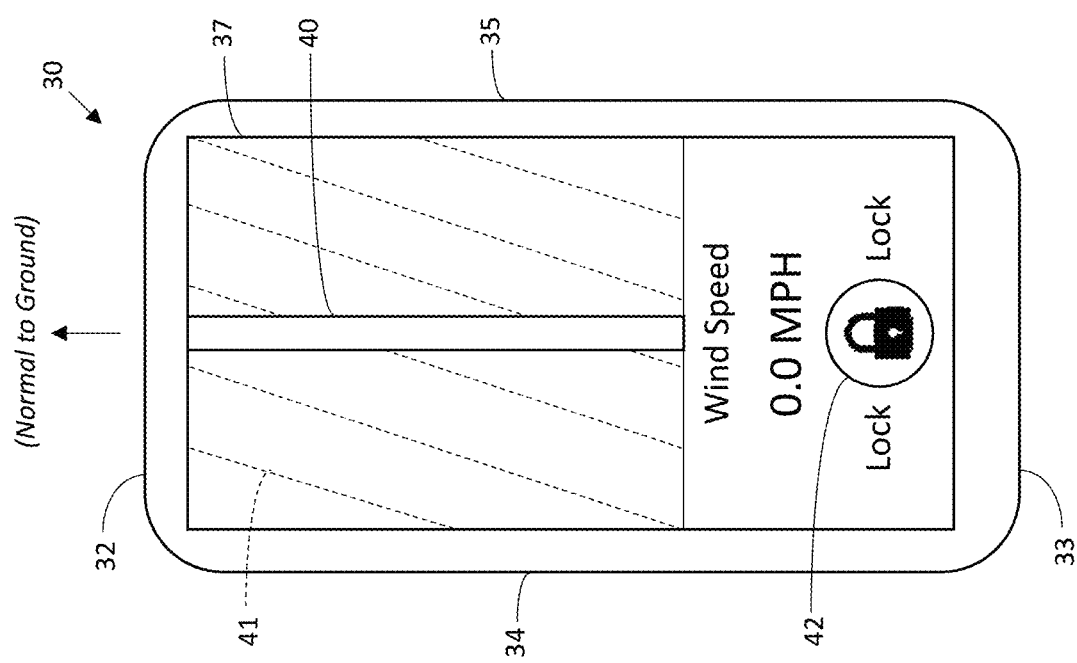

Rain angle will be further understood with reference to FIGS. 2A and 2B. In the illustrated example, the computing device 30 is a mobile phone (smartphone) that includes a digital camera (not shown). In the illustrated example, the various operations described below may be implemented using an application or app that is installed on the computing device 30. The field of view of the digital camera is shown on the display 37, and in this example a rotational reference indicator 40 is superimposed over the camera's field of view on the display. More particularly, the rotational reference indicator 40 in this example is a vertical bar that is parallel to the sides 34, 35 of the portable housing 31. It should be noted that the rotational reference indicator 40 is optional in the present embodiment, as the user may utilize one of the sides 34, 35 of the device to align the device with the rain angle. Moreover, it is not necessary to display rain 41 on the display 37 either, as the user could instead look through a spotting scope or other optic and align the device 30 with what is being seen through the optic.

The digital camera has within its field of view a rain shower, and accordingly displays rain 41 on the display 37. In FIG. 3A, the housing 31 is oriented straight up and down, or normal, relative to the ground. Moreover, the rain 41 shown on the display 37 behind the rotational reference indicator 40 is being blown from left to right by the wind so that the falling rain appears to the observer to be at an angle relative to the rotational reference indicator. However, in FIG. 2B, the portable housing 31 has been rotated such that the sides 34, 35 (and, thus, the rotational reference indicator 40) are parallel with the rain 41. That is, the angular orientation of the device 30 matches the orientation of the rain angle.

The processor 39 obtains the angular rotation measured by the rotational motion sensor 38 (which now corresponds to the rain angle when the device 30 is in the orientation shown in FIG. 2B) and calculates the speed of the wind based upon the measured rain angle, which in the present example is 8.5 miles per hour (MPH), although this value may be calculated/presented in kilometers per hour (KPH), etc., in some embodiments. In an example embodiment, as the user rotates the device 30 the processor increases the measured rain angle in 0.1 mph increments, although other increments may be used in different configurations. The user "pushes" a lock button 42 shown on the display 37, at which the processor 39 locks in the wind speed and shows it on the display (here 8.5 MPH). Pushing the button 42 again unlocks the measured wind speed and begins the measurement process again.

The calculated wind speed information may then be used for various purposes, such as in the case of long rage shooting, plugging into a ballistic rangefinder or ballistic calculator, as will be appreciated by those skilled in the art. In some embodiments, the ballistic rangefinder or ballistic calculator functions may be integrated into a single device 30 or app, such that the ballistic offsets are also provided. In the case that separate devices are used, a wireless link (e.g., Bluetooth®, NFC, Wi-Fi, etc.) may be used to automatically transfer to the wind speed value to the separate ballistic rangefinder or calculator (or other device in different applications).

An example interpolation algorithm which may be used by the processor 39 for calculating the wind speed from the measured rain angle is as follows:

```
if (angle < 2) {
/* 0-2 degrees: no wind */
calc = 0 ;
    } else if (angle < 5) {
/* 2-5 degrees: interpolate 0-3 MPH */
calc = interpolate( 0, 5, 0, 3, angle) ;
    } else if (angle < 10) {
/* 5-10 degrees: interpolate 3-4 MPH */
calc = interpolate( 5, 10, 3, 4, angle) ;
    } else if (angle < 15) {
/* 10-15 degrees: interpolate 4-5 MPH */
calc = interpolate(10, 15, 4, 5, angle) ;
    } else if (angle < 20) {
/* 15-20 degrees: interpolate 5-6 MPH */
calc = interpolate(15, 20, 5, 6, angle) ;
    } else if (angle < 25) {
/* 20-25 degrees: interpolate 6-7 MPH */
calc = interpolate(20, 25, 6, 7, angle) ;
    } else if (angle < 30) {
/* 25-30 degrees: interpolate 7-8 MPH */
calc = interpolate(25, 30, 7, 8, angle) ;
    } else if (angle < 35) {
/* 30-35 degrees: interpolate 8-9 MPH */
calc = interpolate(30, 35, 8, 9, angle) ;
    } else if (angle < 40) {
/* 35-40 degrees: interpolate 9-10 MPH */
calc = interpolate(35, 40, 9, 10, angle) ;
```

```
        } else {
        /* 40+ degrees: 10 MPH */
        calc = 10 ;
        }
```

Figure 3:
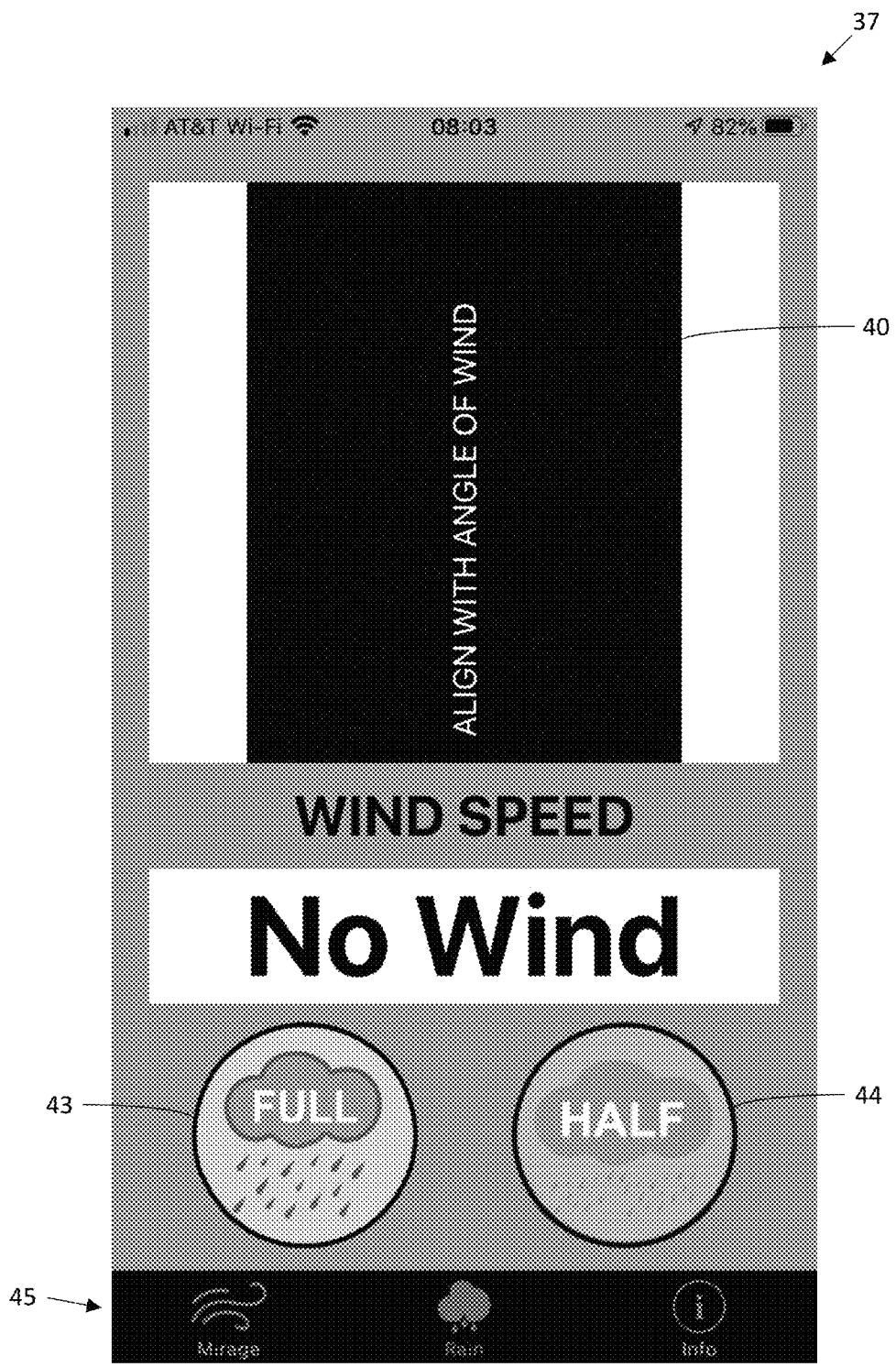
FIG. 3 is a screenshot of an example implementation of the computing device of FIG. 1 illustrating an approach for wind speed estimation based upon a rain angle.

In the example of FIG. 3, further selection options are provided for enhanced accuracy when performing rain angle wind speed estimation. More particularly, two selection indicators or buttons 43, 44 for a full (heavy) rain and a half (normal or light) rain are provided. In a heavy rain, the target begins to appear blurry and hard to see on the display 39, spotting scope, etc. In a normal or light rain, the user is able to see the target on the display 37 or spotting scope and make it out relatively clearly. Rather than a lock button 42 as shown in FIGS. 2A and 2B, here the full and half rain buttons 43, 44 also serve as lock buttons once the user orients the housing 31 to the rain angle and presses one of these buttons to select the type of rain that is present.

In a full or heavy rain, the drops have more mass and it takes a stronger wind to push the rain to the same rain angle as it does in a lighter (normal) rain. Stated otherwise, if a user measures the same rain angle in a full rain vs. a normal rain, it means that the wind blowing the full rain is approximately twice the speed as the wind blowing the normal rain (because it takes more force to blow the heavier rain drops at the same angle). Thus, the processor 39 may calculate the wind angle as if it were a full rain, but if the user selects the half rain button 44 then it would decrease the wind speed calculated based upon the measured rain angle by 50%, whereas if the user selects the full rain button 43 the calculated wind speed will not be decreased (i.e., the full calculated value is output). However, it will be appreciated that this weighting approach could be used in reverse, e.g., the processor 39 calculates the wind speed for a normal rain angle by default, and increases (e.g., doubles) that value if the user indicates the rain is a full (heavy) rain. Moreover, it will also be appreciated that more than two different rain selection buttons 43, 44 may be used in some embodiments (e.g., full, normal, light) having different weightings associated therewith.

It should also be noted that in the present example, the rotational reference indicator 40 is a wide vertical bar (as opposed to the thinner bar in FIGS. 2A-2B), and it will be appreciated that other rotational reference indicator shapes may also be used in different embodiments. Moreover, the processor 39 also displays selectable icons on the bottom of the display 37 in a navigation bar 45. In the present example, the rain angle calculation is selected, but the navigation bar 45 also illustratively includes an info option to navigate to an informational/instructional screen on the display 37, as well as a mirage wind speed calculation screen option, which will now be described with reference to FIGS. 4 and 5 after a brief discussion of mirages.

Mirages are another example of a localized atmospheric event, and they are generally caused by a differential in temperature (e.g., heat rising off of the ground, a roadway, etc., into cooler air) which appears as a shimmer to an observer from a distance. Wind has the effect of pushing a mirage over in the direction the wind is blowing, such that the mirage appears to lean in that direction from the perspective of the observer. This is the angle of the mirage, and referred to as the "mirage angle" herein. If there is no wind, the mirage will be vertically straight up and down relative (normal) to the ground, and therefore have a zero mirage angle.

Figure 4:
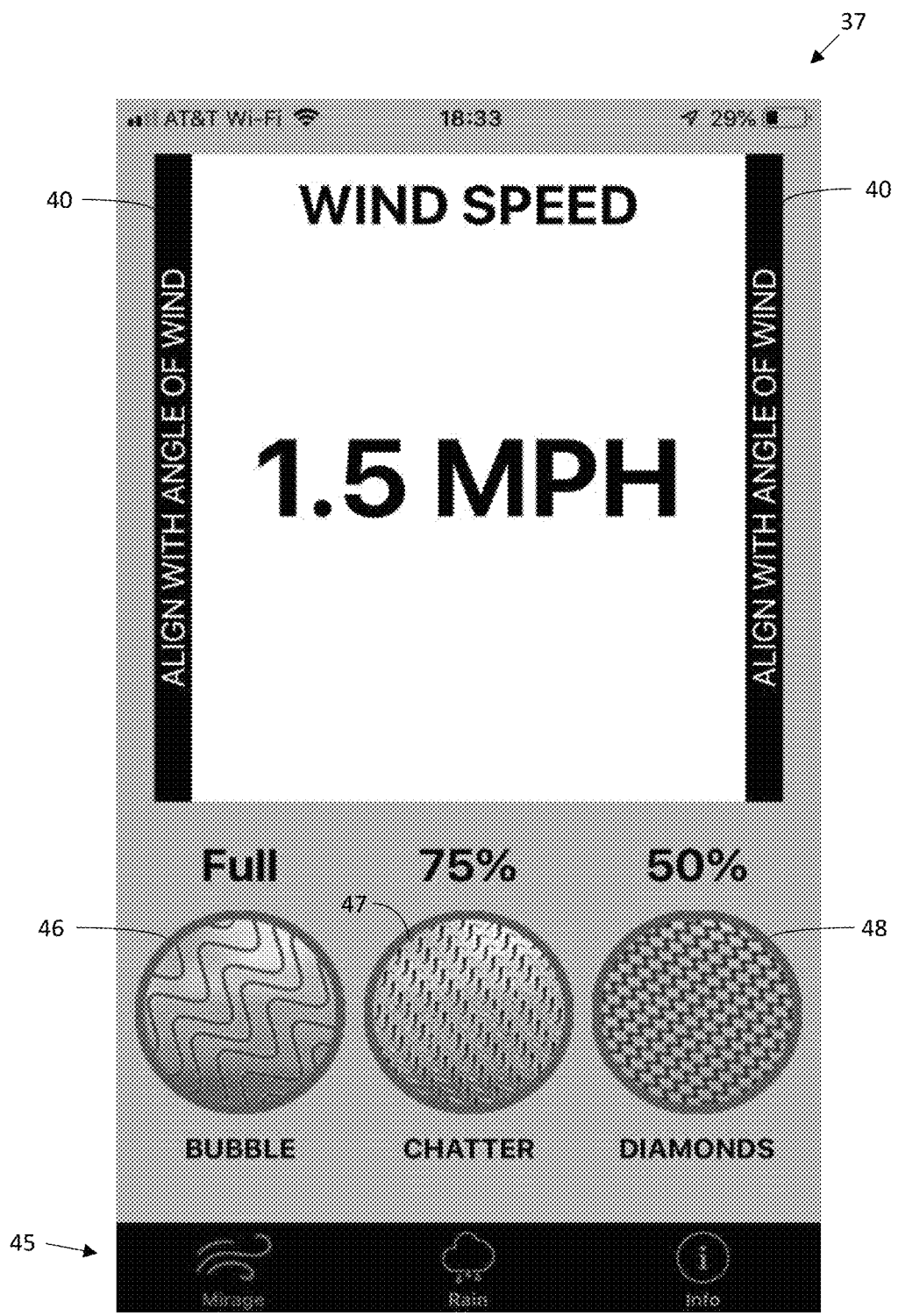
FIG. 4 is a screenshot of an example implementation of the computing device of FIG. 1 illustrating an approach for wind speed estimation from a mirage angle.
Figure 5:
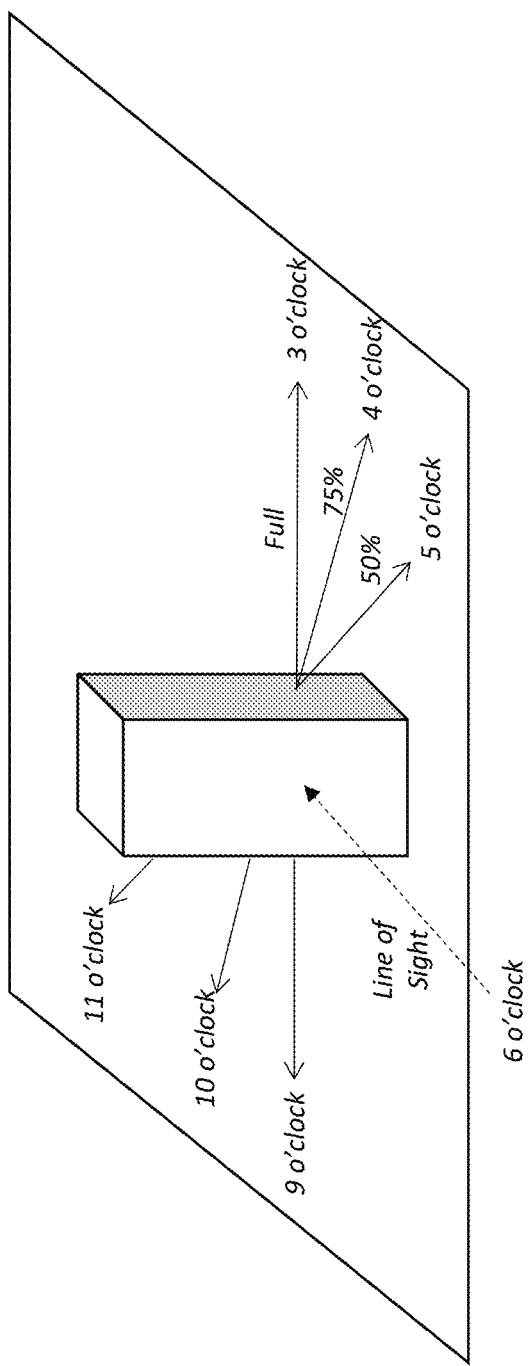
FIG. 5 is a schematic block diagram illustrating how different wind directions relate to the mirage patterns shown in the example of FIG. 4.

The mirage wind speed calculation screen is shown in FIG. 4. In the illustrated example, two rotational reference indicators 40 are provided on the display 37. More particularly, in this example the rotational reference indicators 40 are spaced apart vertical bars which are parallel to one another, as well as the sides 34, 35 of the housing 31. Here again, other rotational reference indicator configurations (or no rotational reference indicators) may be used in some embodiments. As the user looks down a line of sight to a target 50 on the ground 51 (FIG. 5), the user is at the 6 o'clock position. If the wind is perpendicular to the target 50, it is either coming from the 3 o'clock position or the 9 o'clock position, which means the wind will have its maximum (full) effect relative to the line of sight. In the case of a rifle, for example, this means that wind of a given speed will have its maximum effect in terms of pushing the bullet left or right of the target 50 when that wind is coming from the 3 o'clock or 9 o'clock positions.

In this regard, the user may look through a spotting scope (or if the computing device 30 is equipped with a digital camera and zoom lens, then the user may look at the target 50 on the display 37) to see the mirage adjacent the target when it is at a relatively long distance away. It may be beneficial to focus the scope short of the target 50 to better see the mirage in some instances. As the user rotates the housing 32 to the left or right (see FIG. 2B above) so that the sides of the housing 34, 35 (and in this case also the rotational reference indicators 40 on the display 37) match the observed mirage angle, the processor 39 obtains the measured rotational angle from the rotational motion sensor 38 and uses this to calculate a wind speed angle. That is, the harder the wind is blowing, the greater the mirage angle will be. If a mirage is straight up and down with no angle, this conversely means that there is little or no wind present. The wind speed that the processor 39 initially calculates based upon the determined rotational angle is assumed to be from one of the 3/9 o'clock positions, meaning it is at its maximum for the measured angle.

On the other hand, if the wind is coming from the 4/10 o'clock positions, its capacity to push the bullet left or right at the target 50 will be diminished with respect to a 3/9 o'clock wind, which in this example is weighted as 75% of the force of the full strength 3/9 o'clock wind (i.e., the 4/10 o'clock wind will push the bullet left or right with 25% less intensity than the 3/9 o'clock wind). Similarly, wind from the 5/11 o'clock positions will push the bullet left or right with even less intensity, namely 50% of the full force wind from the 3/9 o'clock positions. Although not shown, the effect of the wind from the 1/7 o'clock positions and the 2/8 o'clock positions will be the same in terms of wind speed as from the 5/11 o'clock positions and 4/10 o'clock positions, respectively.

However, the user would otherwise not be able to account for the direction from which the wind is blowing simply by rotating the computing device 30 left or right. As such, the processor 39 is advantageously further configured to display different user selectable mirage patterns 46-48 on the display 37 respectively labeled as "bubble", "chatter", and "diamonds" patterns in the present example. Generally speaking, the appearance of the mirage and the tightness of the waves indicates the direction from which the wind is blowing the mirage relative to the observer's line of sight. The bubble pattern 46 is how a mirage will look to an observer from the 6 o'clock position when the wind is coming from the 3/9 o'clock positions, and accordingly is weighted with the maximum percentage (100%) of the calculated wind speed (full). The chatter bubble pattern 47 is how a mirage will look to an observer from the 6 o'clock position when the wind is coming from the 4/10 or 2/8 o'clock positions, and accordingly is weighted at 75% of the maximum calculated wind speed. The diamonds bubble pattern 48 is how a mirage will look to an observer from the 6 o'clock position when the wind is coming from the 5/11 or 1/7 o'clock positions, and accordingly is weighted at 50% of the maximum calculated wind speed.

Thus, similar to the rain angle example described above, as the user rotates the portable housing 31 so that the sides 34, 35 (and/or the rotational reference indicator(s) 40) match the orientation of the mirage angle, the processor 39 increases the wind speed in 0.1 MPH increments. When the user selects one of the mirage patterns 46-48 corresponding to what is seen through a spotting scope or on the display, the processor 39 calculates the localized wind speed value and weights it according to the directional offset corresponding to the selected pattern (here at full strength, 75% strength, or 50% strength), and optionally locks this value as described above. In this regard, the processor 39 calculates a cosine corrected wind speed value based upon the selected mirage pattern 46-48, since the selected mirage pattern reveals what direction the wind is coming from.

An example interpolation algorithm which may be used by the processor 39 for calculating the wind speed from the measured mirage angle is as follows:

```
            if (angle < 14) {
/* 0 to 14 degrees: no wind
*/
            calc = 0 ;
                } else if (angle < 22.5) {
/* 14 to 22.5 degrees: interpolate 1-2 MPH
*/
            calc = interpolate(14, 22.5, 1, 3, angle) ;
                } else if (angle < 37.5) {
/* 22.5 to 37.5 degrees: interpolate 2-3.5 MPH
*/
            calc = interpolate(22.5, 37.5, 3.5, 4, angle) ;
                } else if (angle < 45) {
/* 37.5 to 45 degrees: interpolate 4-5.5 MPH
*/
            calc = interpolate(37.5, 45, 4, 5.5, angle) ;
                } else if (angle < 60) {
/* 45 to 60 degrees: interpolate 5.5-7 MPH
*/
            calc = interpolate(45, 60, 5.5, 7, angle) ;
                } else if (angle < 90) {
/* 60 to 90 degrees: interpolate 7-9 MPH
*/
            calc = interpolate(60, 90, 7, 9, angle) ;
                }
```

Figure 6:
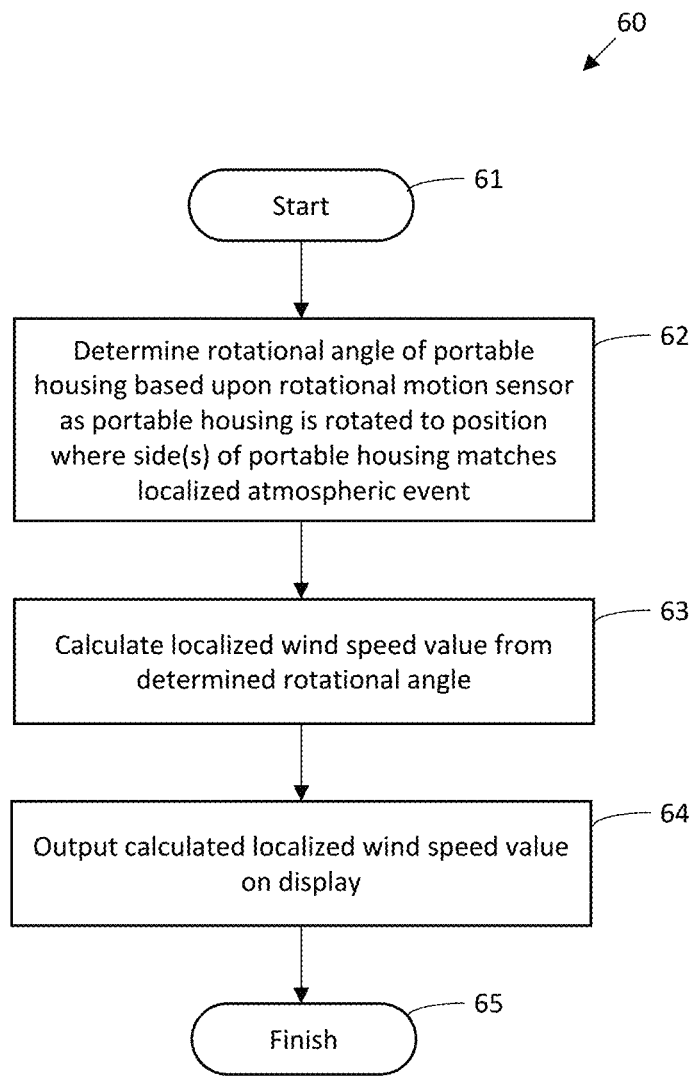
FIG. 6 is a flow diagram illustrating method aspects associated with the computing device of FIG. 1.

Referring additionally to the flow diagram 60 of FIG. 6, related method aspects are now described. The illustrated method begins (Block 61) with the processor 39 determining a rotational angle of the portable housing 31 based upon the rotational motion sensor 38 as the portable housing is rotated to a position where an orientation of at least one of the sides 34, 35 of the portable housing (and/or a rotational reference indicator 40) matches an orientation of a localized atmospheric event (e.g., mirage angle or rain angle), at Block 62. The processor 39 may further calculate a localized wind speed value from the determined rotational angle, at Block 63, and output the calculated localized wind speed value on the display, at Block 64, as discussed further above. The method of FIG. 6 illustratively concludes at Block 65. A non-transitory computer-readable medium may also be provided having computer-executable instructions for causing the processor 39 to perform the various steps set forth above.

The approach set forth herein may accordingly be used for numerous applications where a wind speed estimation is desired at a location where a localized atmospheric event (rain, mirage, etc.) is present. For example, such applications may include determining the localized wind speed at a windmill (or desired location for a windmill) in a wind farm, surveying locations to put wind indicators (e.g., windsocks) or other indicators (such as at airports), crop dusting (spraying) applications, etc. As noted above, other applications may include long range target shooting or hunting where bullet drift is a significant consideration, golf, photography, etc.

Many modifications and other embodiments of the invention will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included.

That which is claimed is:

1. A computing device comprising:
    a portable housing having opposing top and bottom edges and opposing side edges;
    a memory carried by the portable housing;
    a display carried by the portable housing;
    a rotational motion sensor carried by the portable housing; and
    a processor carried by the portable housing and coupled to the memory, the display, and the rotational motion sensor, the processor configured to
        determine a rotational angle of the portable housing based upon the rotational motion sensor as the portable housing is tilted within a plane normal to ground to a position where an orientation of at least one of the sides of the portable housing matches an orientation of a localized atmospheric event at a target location,
        calculate a localized wind speed value at the target location remote from the portable housing from the determined rotational angle, and
        output the calculated localized wind speed value on the display.

2. The computing device of claim 1 wherein the processor is further configured to display at least one rotational reference indicator on the display that is parallel to the at least one side of the portable housing.

3. The computing device of claim 1 wherein the localized atmospheric event comprises a mirage; wherein the processor is further configured to display a plurality of different user selectable mirage patterns on the display; and wherein the processor calculates the localized wind speed value further based upon a selected mirage pattern.

4. The computing device of claim 3 wherein the different user selectable mirage patterns correspond to different wind directions.

5. The computing device of claim 3 wherein the processor is configured to calculate a cosine corrected wind speed value based upon the selected mirage pattern.

6. The computing device of claim 1 wherein the localized atmospheric event comprises rain; wherein the processor is further configured to display a plurality of user selectable rain intensity indicators on the display corresponding to different respective rain intensities; and wherein calculating comprises calculating the localized wind speed value further based upon a selected rain intensity indicator.

7. The computing device of claim 1 wherein the rotational motion sensor comprises at least one of an accelerometer, gyroscope, and a magnetic field sensor.

8. A computing device comprising:
a portable housing;
a memory carried by the portable housing;
a display carried by the portable housing;
a rotational motion sensor carried by the portable housing; and
a processor carried by the portable housing and coupled to the memory, the display, and the rotational motion sensor, the processor configured to
display at least one rotational reference indicator on the display,
determine a rotational angle of the portable housing based upon the rotational motion sensor as the portable housing is tilted within a plane normal to ground to a position where an orientation of the at least one rotational reference indicator matches an orientation of a localized atmospheric event at a target location,
calculate a localized wind speed value at the target location remote from the portable housing from the determined rotational angle, and
output the calculated localized wind speed value on the display.

9. The computing device of claim 8 wherein the at least one rotational reference indicator comprises a vertical bar that is parallel to a side of the portable housing.

10. The computing device of claim 8 wherein the localized atmospheric event comprises a mirage; wherein the processor is further configured to display a plurality of different user selectable mirage patterns on the display; and wherein the processor calculates the localized wind speed value further based upon a selected mirage pattern.

11. The computing device of claim 10 wherein the different user selectable mirage patterns correspond to different wind directions.

12. The computing device of claim 10 wherein the processor is configured to calculate a cosine corrected wind speed value based upon the selected mirage pattern.

13. The computing device of claim 8 wherein the localized atmospheric event comprises rain; wherein the processor is further configured to display a plurality of user selectable rain intensity indicators on the display corresponding to different respective rain intensities; and wherein calculating comprises calculating the localized wind speed value further based upon a selected rain intensity indicator.

14. The computing device of claim 8 wherein the rotational motion sensor comprises at least one of an accelerometer, gyroscope, and a magnetic field sensor.

15. A non-transitory computer-readable readable medium for a computing device comprising a portable housing having opposing top and bottom edges and opposing side edges, a display carried by the portable housing, a rotational motion sensor carried by the portable housing, and a processor, the non-transitory computer-readable medium having computer-executable instructions for causing the processor to perform steps comprising:
determining a rotational angle of the portable housing based upon the rotational motion sensor as the portable housing is tilted within a plane normal to ground to a position where an orientation of at least one of the sides of the portable housing matches an orientation of a localized atmospheric event at a target location;
calculating a localized wind speed value at the target location remote from the portable housing from the determined rotational angle; and
outputting the calculated localized wind speed value on the display.

16. The non-transitory computer-readable readable medium of claim 15 further having computer-executable instructions for causing the processor to perform a step of displaying at least one rotational reference indicator on the display that is parallel to the at least one side of the portable housing.

17. The non-transitory computer-readable readable medium of claim 15 wherein the localized atmospheric event comprises a mirage; further having computer-executable instructions for causing the processor to perform a step of displaying a plurality of different user selectable mirage patterns on the display; and wherein calculating comprises calculating the localized wind speed value further based upon a selected mirage pattern.

18. The non-transitory computer-readable readable medium of claim 17 wherein the different user selectable mirage patterns correspond to different wind directions.

19. The non-transitory computer-readable readable medium of claim 17 wherein calculating further comprises calculating a cosine corrected wind speed value based upon the selected mirage pattern.

20. The non-transitory computer-readable readable medium of claim 15 wherein the localized atmospheric event comprises rain; further having computer-executable instructions for causing the processor to perform a step of displaying a plurality of user selectable rain intensity indicators on the display corresponding to different respective rain intensities; and wherein calculating comprises calculating the localized wind speed value further based upon a selected rain intensity indicator.

* * * * *